Aug. 25, 1959  T. R. BURNIGHT ET AL  2,901,742
BLIND LANDING SYSTEM
Filed Nov. 19, 1945  6 Sheets-Sheet 1
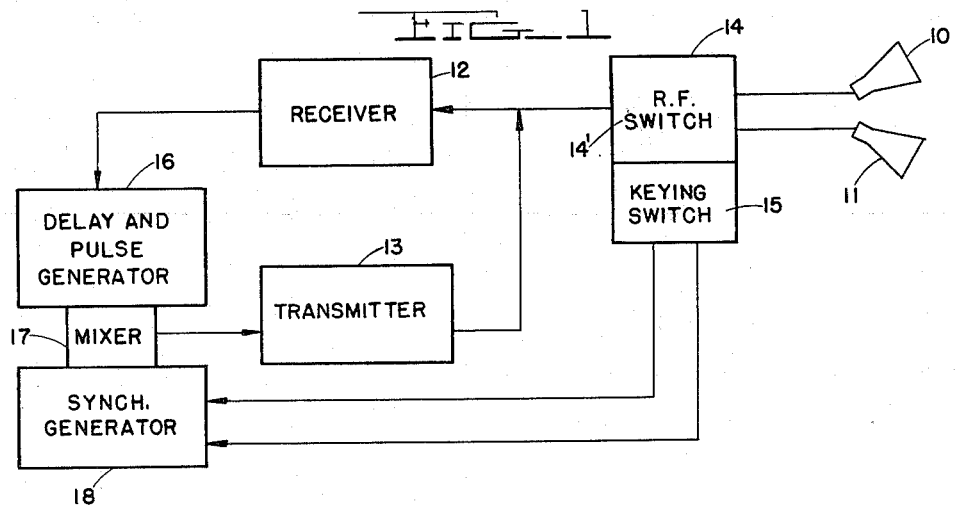
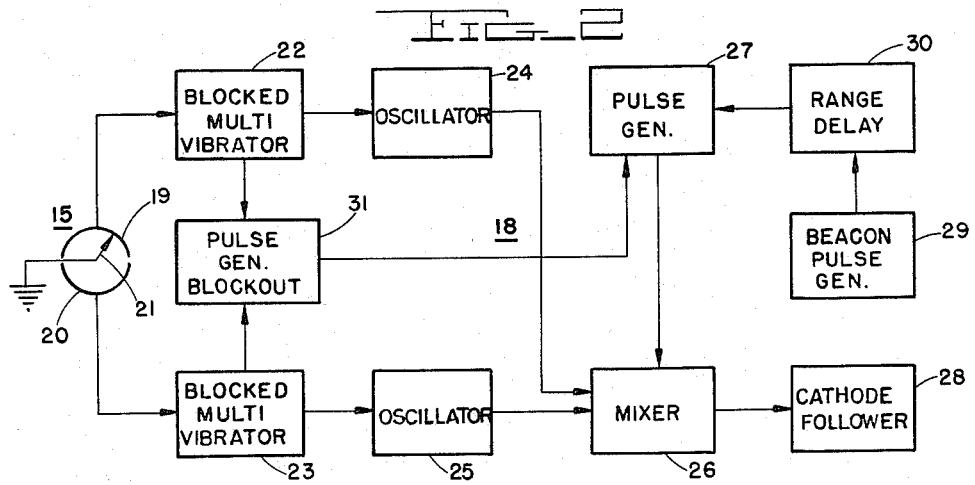
Inventors
T. ROBERT BURNIGHT
ROBERT A. EMMETT JR.
By Ralph L Chappell
Attorney

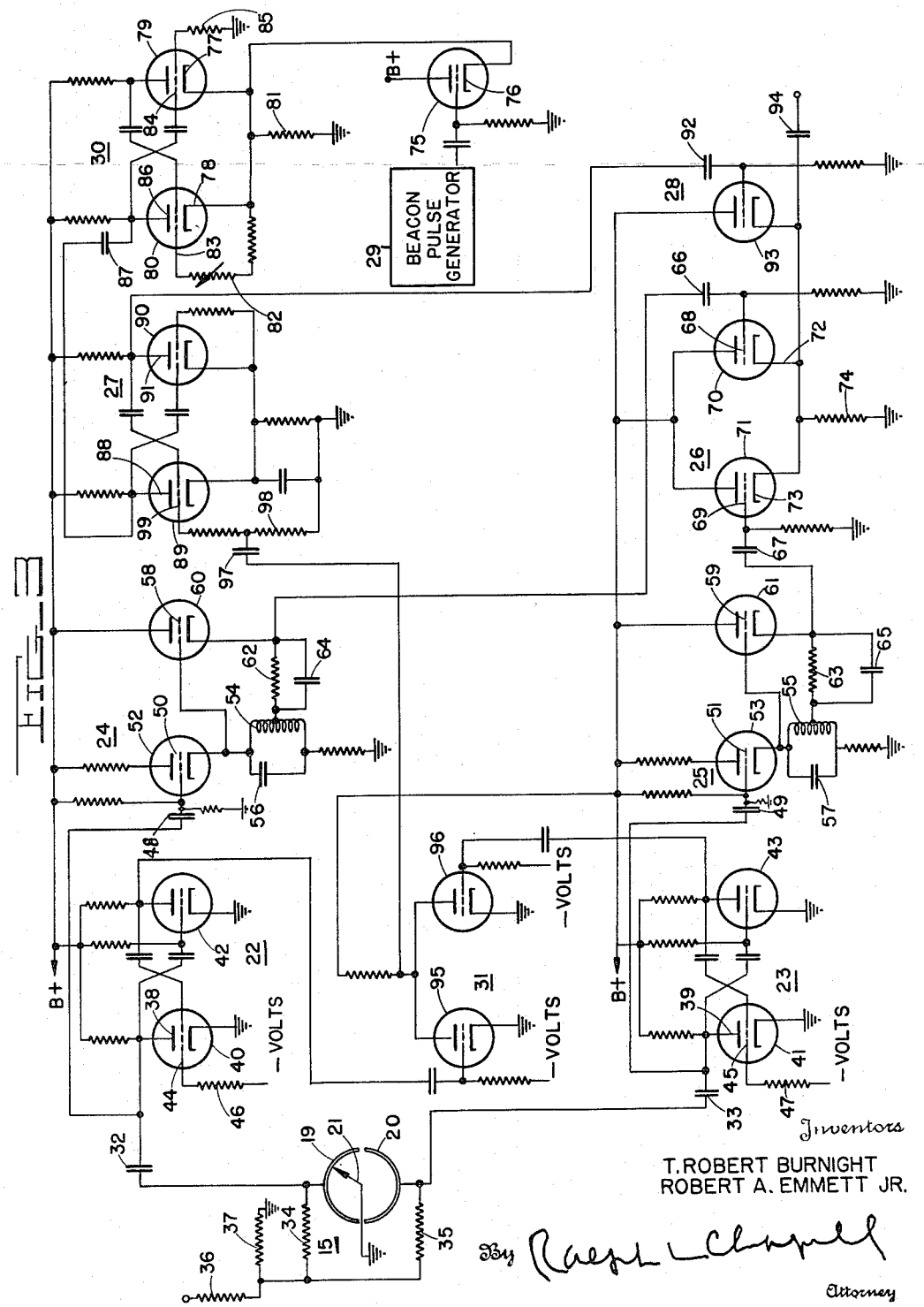

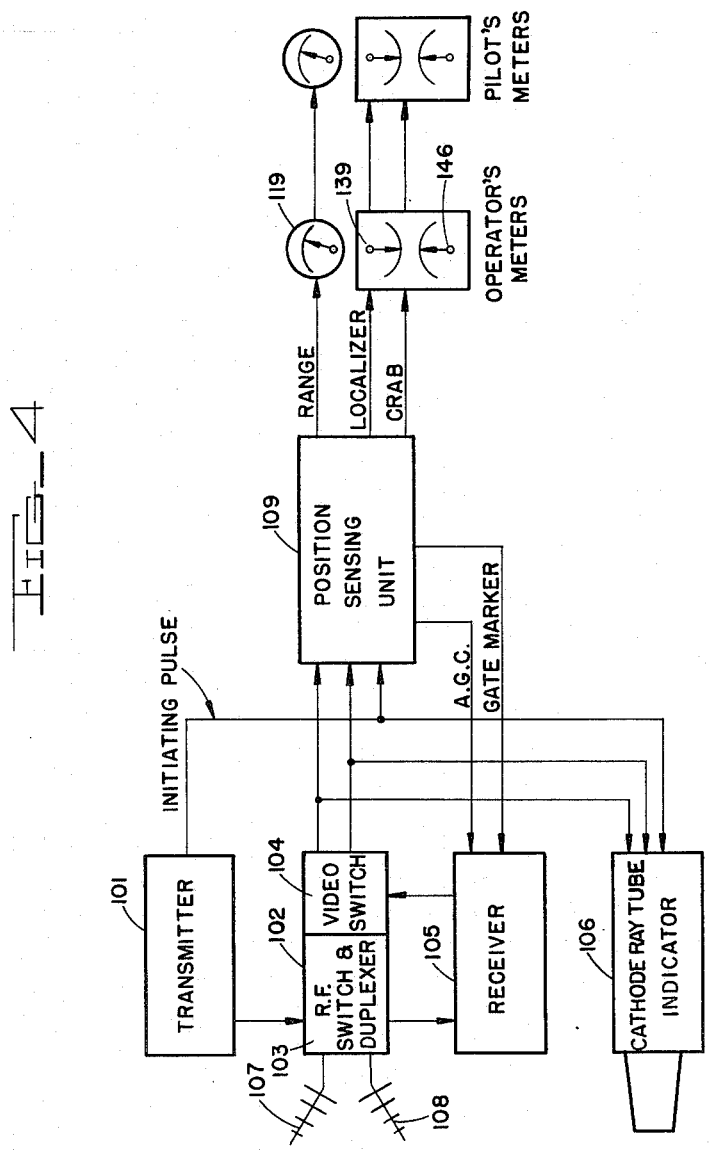

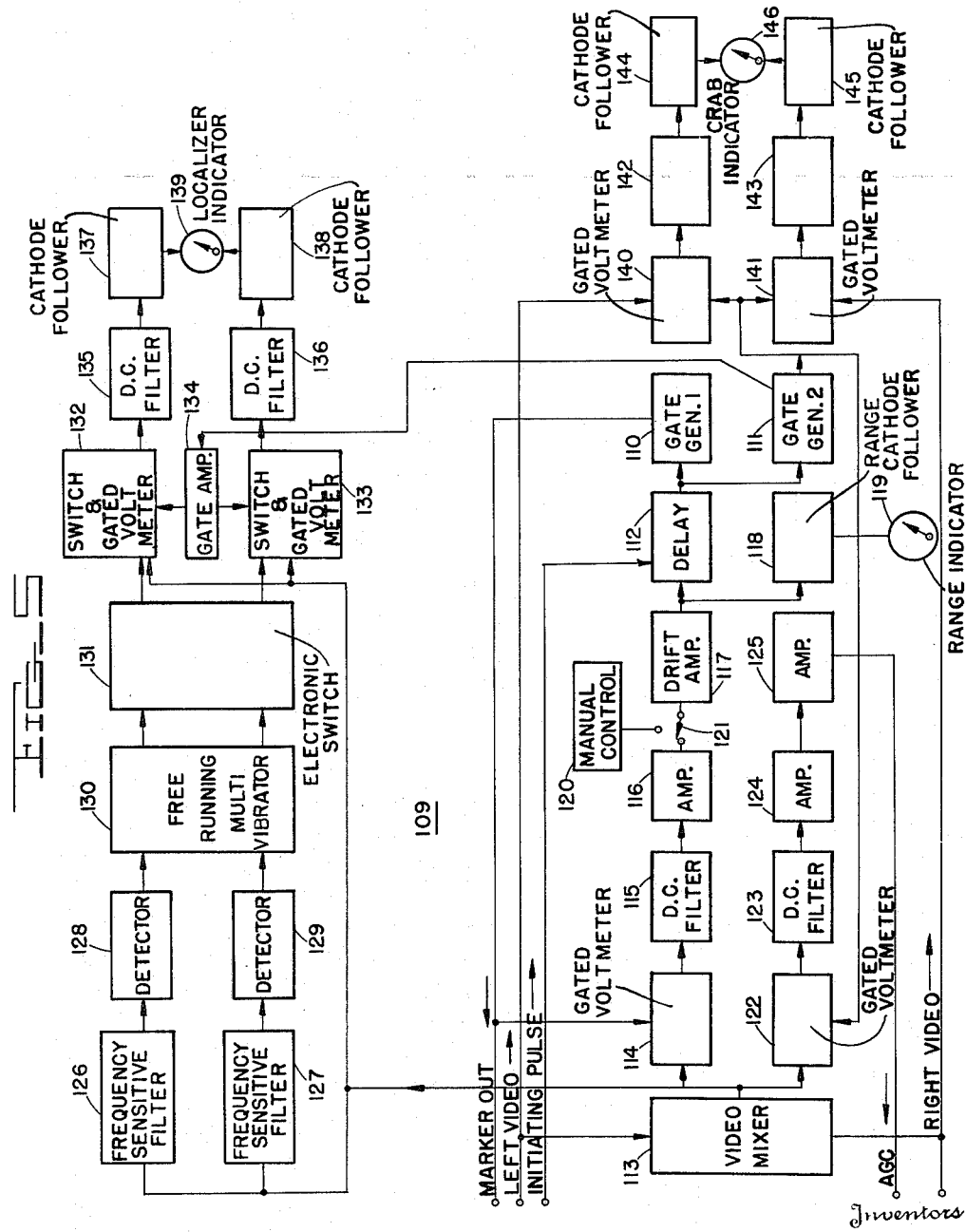

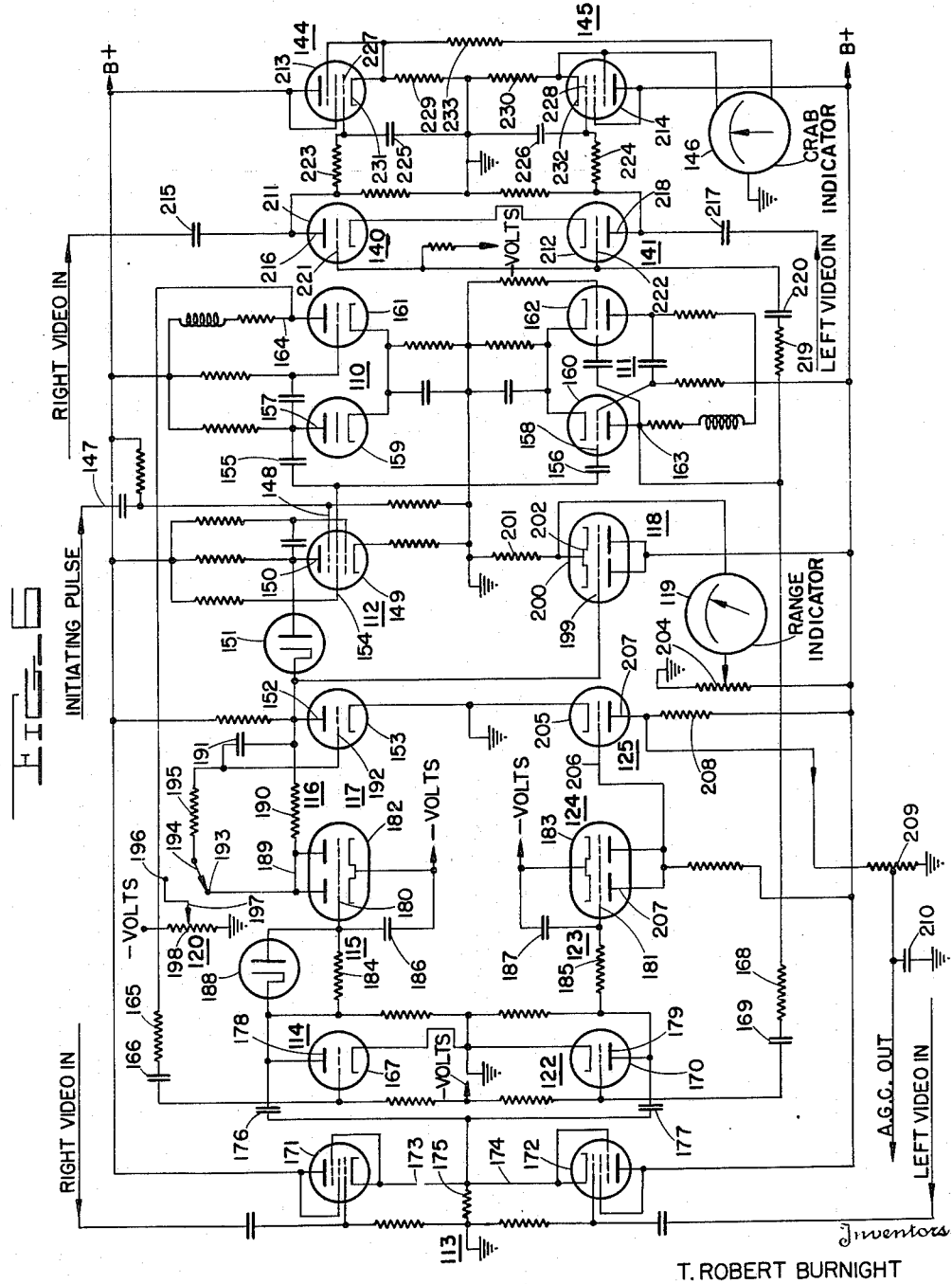

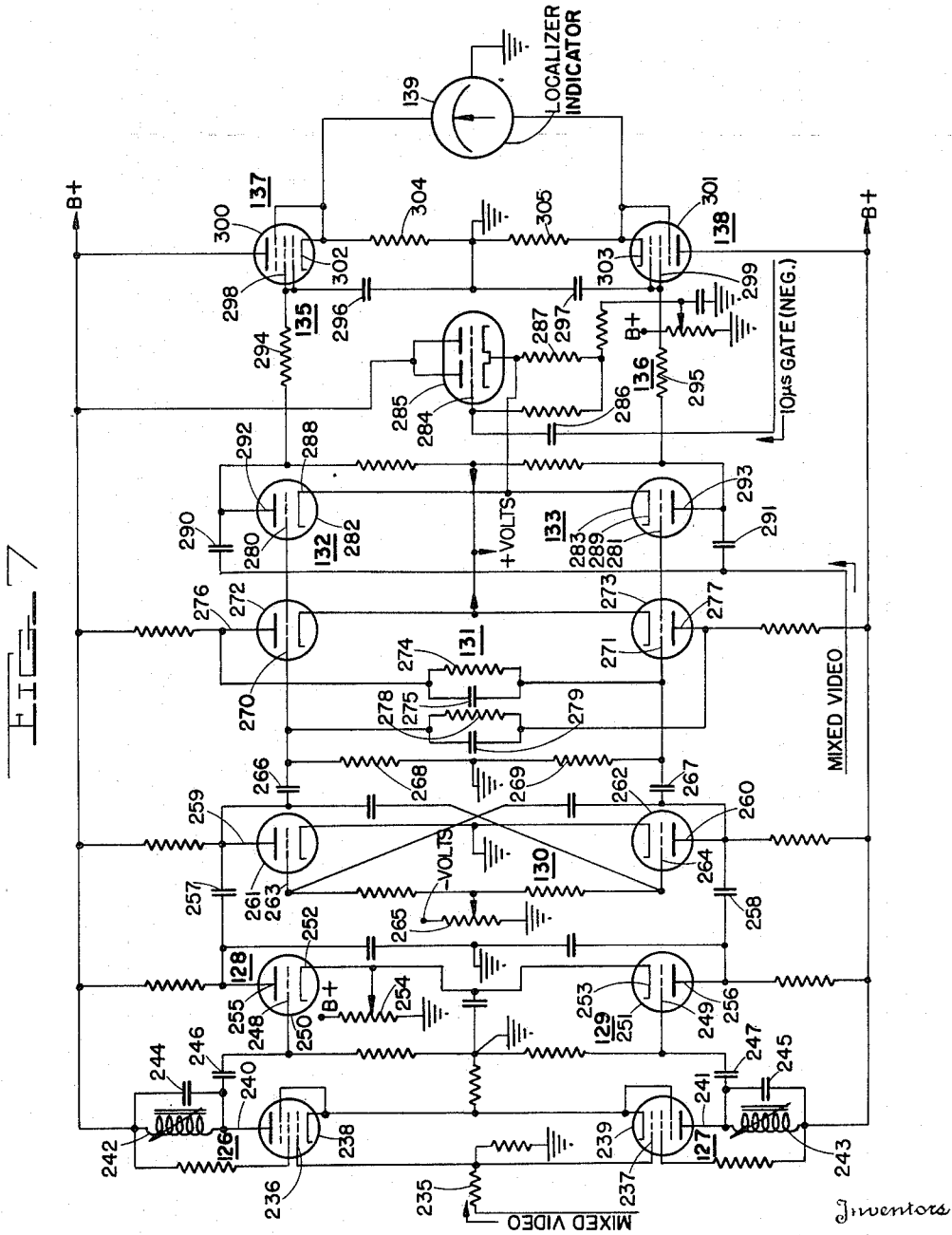

United States Patent Office 2,901,742
Patented Aug. 25, 1959

2,901,742

BLIND LANDING SYSTEM

Thomas Robert Burnight, Washington, D.C., and Robert A. Emmett, Jr., United States Navy Application November 19, 1945, Serial No. 629,688

5 Claims. (Cl. 343—6)

(Granted under Title 35, U.S. Code (1952), sec. 266)

The present invention relates in general to radio landing systems for aircraft and, more particularly, to means for providing an indication on a landing aircraft of the position and heading of the aircraft with respect to beacons or radiation fields forming the guidance means for the landing operation.

Radio landing systems, of the type generally employed, comprise radiated fields established by transmitting means located on the ground adjacent the landing area and which define courses in space which are followed by the aircraft in landing. Such systems include a plurality of radio beacons aligned with the runway to be used in the landing operation to define the proper course path, vertical glide path and distance to the runway. The aircraft must carry equipment responsive to the radiation fields of these beacons to indicate proper course, glide path, heading of the aircraft with respect to the transmission point, and range to enable the pilot to complete a successful landing. To generate the radiation fields defining these paths and to provide means in the aircraft for presenting this information to the pilot in a readily useable form requires a large amount of bulky and special equipment in both the ground and aircraft installations.

Accordingly, it is an object of this invention to provide a blind landing system employing conventional echo ranging equipment usually carried in military aircraft to produce a highly accurate blind approach system with a minimum of additional equipment.

Another object of the invention is to provide a blind landing system employing conventional echo ranging equipment usually carried in a military aircraft, in which the components of the blind landing system are so interconnected with the echo ranging equipment that the echo ranging equipment may be operated independently of the system in normal fashion when desired.

Another object of the invention is to provide a novel blind landing system having accurately defined course and glide paths substantially free from course bends due to reflections.

Another object of the invention is to provide a novel blind landing system in which interference from radiation fields other than those defining the course and glide paths is reduced to a minimum.

Another object of the invention is to provide a receiving and indicating means operable with a radio landing system in which the received radiations will operate a metering means to provide an indication of the position and heading of the landing aircraft with respect to the runway localizer course and the path to ground established by the landing beam.

Other objects, advantages and capabilities of the invention will become apparent from the following description, taken in conjunction with the accompanying drawings showing only a preferred embodiment of the invention, in which:

Fig. 1 is a block diagram of the ground installtaion of the blind landing system forming the present invention;

Fig. 2 is a block diagram of the synchronizing generator unit in the ground installation;

Fig. 3 is a schematic diagram of the synchronizing generator and pulse generating circuits in the ground installation;

Fig. 4 is a block diagram of the aircraft installation of the blind landing system forming the present invention;

Fig. 5 is a block diagram of the position sensing unit in the aircraft installation;

Fig. 6 is a schematic diagram of the automatic gating, range, automatic volume control, and "Crab" indication circuits of the position sensing unit; and Fig. 7 is a schematic diagram of the localizer or "On Course" indicator circuit of the position sensing unit.

This system involves the use of conventional interrogator-responsor radio beacons which are actuated by echo ranging apparatus carried in aircraft to indicate the range and azimuth of the interrogator-responsor beacon to the aircraft. Since these beacons are normally non-directional, certain modifications are required to render them applicable to the present system. Assuming an aircraft is required to make a blind landing, on reaching the general region of the runway localizer beam, usually by homing on an auxiliary homing beacon, it is necessary for the airborne receiver and position sensing unit to be tuned to the interrogator-responsor beacon generating the radiation fields defining the course and glide paths to the runway, a range gate in the position sensing unit to be set on the beacon signal and the circuits thrown on automatic operation. These functions may be performed manually by the operator or by automatic means such as that forming the subject matter of co-pending application Serial No. 649,437 filed February 21, 1946 entitled "Automatic Range Tracking Circuit," now Patent No. 2,854,661. Upon interrogation by an airborne echo ranging system, the beacon is required to respond with a signal from which the aircraft can determine its location, heading and range with respect to the desired runway.

The equipment used to obtain this result consists of two directional sectoral horns, an antenna switch, a modified interrogator-responsor beacon, and a synchronizing generator. The function of the interrogator-responsor beacon is to receive the interrogating pulse from the aircraft echo ranging system and respond with a pulse in return. These beacon response pulses are switched in groups from one horn to the other. These two horns are so placed that their field patterns overlap along the center line of the runway. Therefore, an aircraft flying to one side of the center line of the runway receives a stronger signal from one horn than from the other. By comparing the relative amplitude of these two signals, the position of the aircraft relative to the center line is determined.

Timing information must also be supplied to the aircraft, so that the circuits know when to compare one signal with the other. This is a function of the synchronizing generator. At the instant of switching to the left horn, the video switch section of the horn antenna switch triggers a multivibrator in the synchronizing generator which keys an oscillator, thus generating a pulse modulating signal of a predetermined frequency. This signal is then mixed with the beacon response signal to modulate the transmitter and be transmitted through the left horn. Similarly, when the horn antenna switch connects the right horn to the beacon transmitter, the synchronizing generator generates a pulse modulating signal of a different predetermined frequency which is transmitted through the right horn. These synchronizing pulses are not related in any way to the interrogating pulse of the echo ranging system, but are used to synchronize an electronic switch in the position sensing unit in the aircraft installation, so that measuring circuits can be switched on and off corresponding to the particular ground horn in use at the moment.

It is also a function of the synchronizing generator to delay the beacon response pulse a variable amount which depends upon the location of the beacon installation with respect to the upwind end of the runway. Since range is measured in the aircraft by the time delay between the interrogating and response pulses, it is necessary that a standard delay represent zero range. For this reason a variable delay is inserted in the beacon response so that for various distances of location of the beacon from the end of the runway a designated range appearing on the echo ranging indicator in aircraft will always represent the landing point on the runway. Moreover, to give clearance between the beacon response pulse and the interrogating pulse, an additional standard delay is incorporated.

While only the horizontal course path defining system will be described in the specific embodiment of the invention, it will be apparent that a similar system may be employed to define the vertical glide path to the runway by establishing a pair of directional pulsed radiation fields of narrow beam width vertically spaced so that the equi-signal path between the two fields defines the desired approach path in space.

Referring now to Fig. 1, there is shown left and right sectoral horns 10 and 11, respectively, connected to the beacon receiver 12 and transmitter 13 through a switch generally designated by the reference numeral 14. This switch is made up of two sections, a radio frequency switch 14' and a video switch 15 which are rotated on the same shaft in synchronism. The interrogating pulse passes from one horn through the switch 14' to the receiver 12 where the signal is detected and passed on to a delay circuit 16. A pulse is formed in this delay circuit 16, combined with synchronizing signals generated from a synchronizing generator 18 in mixer 17, and transmitted back through the R–F switch section 14' and out through the same horn 10. The video switch section 15 meanwhile triggers the synchronization forming circuit 18 simultaneously with the switching of the horns 10 and 11. The synchronizing signals generated thereby are mixed with the delayed pulse and passed to the transmitter 13, the radio frequency switch 14', and the sectoral horns 10 and 11.

Referring now to Fig. 2, there is shown the block diagram of the synchronizing generator, the range delay circuit, the pulse generator circuit, and the mixer for the response signals, all of which are incorporated in the same unit with the synchronizing generator circuit, this unit being adapted to replace one of the two frequency band transponders usually found in this type of interrogator-responsor beacon. The video section 15 of the antenna switch 14 is shown at the left of this figure, and consists merely of two sectors 19 and 20 which are alternately grounded through a rotating switch arm 21. Connected to the switch sectors 19 and 20 are blocked multivibrators 22 and 23, respectively, adapted to be triggered when the sector to which it is connected is grounded through the switch. The block multivibrators 22 and 23, when triggered, generate a pulse of short duration which unlocks one of the oscillators 24 and 25 coupled to the output thereof. The unlocked oscillator runs for the duration of the pulse output of the multivibrator, the output from either oscillator being fed to a mixer 26 where it is mixed with signals coming from a pulse generator 27. From this mixer 26, the signal is passed through the cathode follower buffer stage 28 in the interrogator-responsor beacon and then to the beacon transmitter 13, shown in Fig. 1. The two oscillator circuits 24 and 25 are similar except for the frequency to which they are tuned. The pulse generator 29, found in the conventional beacon, is connected to a blocked multivibrator 30 which has a pulse output of variable width controlled by a potentiometer. The pulse generator 29 triggers this range delay multivibrator 30. The trailing edge of the pulse from the delay multivibrator 30 is differentiated and used to trigger another multivibrator 27 which forms the pulse and used to modulate the beacon transmitter 13. Also shown is the block-out generator 31 which prevents the response pulse generator 27 from triggering simultaneously with the formation of a synchronizing pulse. This triggering otherwise occurs due to feedback in the circuit.

In Fig. 3 is shown the synchronizing generator and pulse circuits. Starting at the left, condensers 32 and 33 are normally charged positive through series resistors 34 and 35 tapped off of a bleeder potentiometer formed by resistors 36 and 37 connected across a D.C. voltage. As the antenna switch 14 rotates, the video switch section 15, which is represented by the two arc segments 19 and 20, alternately grounds one or the other of the condensers 32, 33 through the switch arm 21, thereby rapidly discharging the condensers and forming a sharp-edged pulse. The condensers 32, 33 are connected to the plates 38 and 39 of tubes 40 and 41 in blocked multivibrators 22 and 23, respectively. The blocked multivibrators 22 and 23, consisting of tubes 40, 42 and 41, 43 coupled together to form a conventional multivibrator circuit, assume a normal condition with the tubes 40 and 41 cut off, these tubes normally being held cut off by a negative potential applied to the grids 44, 45 through resistors 46, 47. The pulses generated by the discharging of the condensers 32, 33 are differentiated through these condensers and trigger the blocked multivibrator by causing the tubes 40 and 41 to conduct. Negative pulses of a duration determined by the circuit constants of the multivibrators, generated at the plates 38 and 39 of tubes 40 and 41 when these tubes are caused to conduct, are coupled through condensers 48, 49 to the grids 50, 51 of oscillator tubes 52 and 53. These oscillators are of the conventional shock-excited type, having tank circuits tuned to different frequencies comprising coils 54, 55 and condensers 56, 57 in their cathode circuits. Directly coupled to the cathode of the tubes 52, 53 are grids 58, 59 of tubes 60 and 61. The cathodes of tubes 60, 61 are coupled to a center tap on the coils 54, 55 of the oscillator tank circuit through resistors 62, 63 and condensers 64, 65. Due to the feed back action in the cathode circuit of the tubes 60 and 61 the amplitude of the oscillations in the oscillator tank circuits is maintained substantially constant. Oscillator tubes 52 and 53 are normally conducting quite heavily.

The negative trigger generated at the tubes 40 and 41, when one of the multivibrators is triggered, cuts off the oscillator tubes 52 and 53, depending upon which oscillator is being triggered, and shock-excites one of the coils 54, 55 in their cathode circuits. The succeeding oscillations are coupled from the resistors 62 and 63 through condensers 66 and 67 to grids 68, 69 of mixer tubes 70 and 71, respectively. The cathodes 72 and 73 of the mixer tubes 70 and 71 are coupled through a common resistor 74 to ground.

Pulse generator 29 of the interrogator-responsor beacon generates a positive pulse which is fed to the grid of buffer triode 75, the cathode 76 of which is connected directly to the cathodes 77 and 78 of tubes 79 and 80 forming the range delay multivibrator 30. A resistor 81 common to the cathodes 77, 78 and 76 is connected between the cathodes and ground. The tubes 79 and 80 are interconnected as a conventional multivibrator having a variable potentiometer 82 connected between the grid 83 and cathode 78 of tube 80 by which the conducting period of tube 79 may be manually regulated, and the grid 84 of tube 79 connected to ground through resistor 85. In normal condition, tube 80 is conducting while tube 79 is cut off. Positive pulses generated by the beacon pulse generator 29 will therefore be coupled into the common cathode resistor 81, triggering the delay multivibrator to generate at the plate 86 of tube 80 a positive trigger pulse of variable width, whose width is controlled by potentiometer 82. This output pulse is differentiated by condenser 87 and coupled to the plate 88 of the tube 89 in the pulse generator 27. Tubes 89 and 90 are interconnected as a conventional multivibrator, with tube 89 normally cut off and tube 90 normally conducting. The trailing edge of the input pulse to plate 88 is used to trigger off the pulse generator tubes 89, 90, thus generating a high voltage positive pulse on the plate 91 of tube 90 of a predetermined duration determined by the circuit constants of the stage. This pulse is coupled through condenser 92 to the grid of a cathode follower triode 93, the cathode of which is coupled to the cathodes 72 and 73 of the mixer tubes 70 and 71 and thus through the common resistor 74. Thus, the response pulses generated by the pulse generator 27 are mixed with the synchronizing pulses generated by the oscillators 52 and 53 in the resistor 74 and are coupled from this resistor through the condenser 94 to the transmitter of the transpondor beacon.

Also included in the synchronizing generator is a pulse generator blockout circuit 31 comprising triodes 95 and 96, each grid of which is coupled to the output of one of the blocked multivibrators 22 and 23 at tubes 42 and 43. The purpose of these blockout tubes 95 and 96 is to prevent the pulse generator tubes 89 and 90 from being fired by R-F feedback of the synchronizing pulses. The plates of tubes 95 and 96 are coupled through condenser 97 to a tap on resistor 98 connected between the grid 99 of the pulse generator tube 89 and ground. The output of tubes 95 and 96, which is a mixture of the blocked multivibrator pulses, is taken up to block any triggering of the pulse generator tubes 89 and 90. Thus the synchronizing generator has performed the functions of delaying and regenerating the response pulses and has formed synchronizing pulses simultaneously with the switching of the horns, mixed them all together, and fed them out to the interrogator-responsor transmitter for transmission to the directional sectoral horns.

Referring now to Fig. 4, there is shown a normal airborne echo ranging installation comprising transmitter 101, antenna switch 102 consisting of radio frequency switch and duplexer 103 and video switch 104, receiver 105, indicator 106, and Yagi antennas 107 and 108 adapted to be mounted on each wing of the aircraft. A position sensing unit 109 is connected in parallel with the cathode ray oscillograph indicator 106, in no way affecting the normal operation of the echo ranging equipment. In addition, however, the position sensing unit 109 generates an automatic gain control voltage which is fed back into the receiver 105. This is necessary since the signal increases quite rapidly as the aircraft approaches the runway. Also, a gate marker is injected into the receiver 105 so that it will appear on the cathode ray indicator 106 enabling the operator to set the range gate on the response signal from the beacon.

In order that the position sensing unit circuits may give indications only of the proper beacon pulses, where there may be other beacon pulses and noises present, it is necessary that the signal be gated. This is done, of course, by gating in range. Moreover, since it is difficult for an operator to maintain the gate upon the signal, it is necessary for the gate to follow the signal automatically. Referring to Fig. 5, in which is shown a block diagram of the various timing and comparing circuits in the sensing unit, two gates are generated, hereafter referred to as gate 1 and gate 2. Gate 1 is a comparatively narrow pulse of about 3 microseconds duration. Gate 2 is about 10 microseconds in duration. These gates are generated in gate generator 110 and gate generator 111, respectively, the gate generators being triggered simultaneously by a delay circuit 112. This delay circuit 112 is a "phantastron" circuit, which is explained below, when triggered by the transmitter initiating pulse, generates a pulse of variable width, this width being controlled by a D.C. voltage. The trailing edge of this pulse is used to trigger the gate generators 110 and 111. To obtain a control voltage for this delay generator 112, both left and right video signals from the Yagi antennas 107 and 108 are passed into a video mixer 113 so that both left and right video signals appear in the output. This mixed signal is passed to the plate of a gated peak reading voltmeter circuit 114, this circuit being gated with the output pulse of gate generator 110. This voltmeter circuit is similar to a normal shunt diode circuit except that a triode is used so that the tube may be turned on and off by the gate. The advantage of using this type of circuit is that no voltage is developed unless the signal and the gate coincide. The output of this tube is filtered through a D.C. filter 115, passed through amplifier 116, and then to a second amplifier 117 known as the drift amplifier. The drift amplifier 117 is so arranged that in the absence of a signal from the voltmeter circuit 114, its plate drifts in a positive direction. With such a voltage, the delay circuit 112 will generate a pulse of increasing width, thereby placing the gate of gate generators 110 and 111 further and further out in range. When the gate does run into a signal, the voltmeter circuit 114 will generate a voltage which drives the plate of the drift amplifier 117 in a negative direction. The net effect is such that the gate will balance on the leading edge of the signal. The three microsecond gate is used for this purpose so that the ten microsecond gate will then surround the signal in range. Since the control voltage of the delay circuit 112 is proportional to range, this voltage is passed through a cathode follower 118 to a range meter 119. This ranger indication then will depend upon the stability and linearity of the delay generator 112. Because the rate of drift of the drift amplifier 117 is comparatively slow, a manual control 120 is provided to set the initial position of the gate. In practice, the operator throws the drift amplifier 117 on manual control by means of switch 121, places the gate just short in range of the signal desired and then throws the automatic following circuit on automatic operation. The gate will then drift the remaining distance into the signal, lock on, and follow the signal from that point.

A similar circuit is used to generate the automatic gain control voltage to be fed back to the receiver 105 of Fig. 4. This automatic gain control voltage, hereafter called A.G.C. voltage, is designed to vary with the peak amplitude of the signal. The mixed signal output of the video mixer 113 of Fig. 5 is fed into another gated voltmeter circuit 122 which in this case is gated by the ten microsecond gate generator 111 which surrounds the signal. The output of the voltmeter 122 is fed through a D.C. filter 123, through an amplifier 124, to a second amplifier 125. This second amplifier 125 is a quick acting amplifier rather than a drift amplifier, so that the A.G.C. action is relatively fast. The output of this amplifier is fed through a conventional manual and automatic switching arrangement to the echo ranging receiver 105.

The mixed signal output of video mixer 113 is fed to two tuned filters 126 and 127, one tuned to the frequency of the oscillator 24 and the other tuned to the frequency of the oscillator 25 of the ground installation previously referred to. These two filters 126 and 127 extract the slugs at the two predetermined frequencies, detect them through detectors 128 and 129 and use them to synchronize a freely running multivibrator 130. This multivibrator 130 is adjusted to run at approximately the same speed as the ground antenna switch 14, so that the synchronizing pulses bring the multivibrator 130 into synchronization with the ground antenna switch 14. To obtain a flat top switching pulse, the multivibrator 130 is used to operate an electronic switch 131. The output of the electronic switch 131 is fed to two gated voltmeter circuits 132 and 133. The flat top switching pulses alternately turn on one and then the other of the voltmeter circuits 132 and 133 in synchronism with the switching of the ground sectoral horns. Gate 2 is fed through gate amplifier 134 to both the vacuum tube voltmeters 132 and 133 to gate the signals in range. The mixed signal output of mixer 113 is fed to the plates of both vacuum tube voltmeters 132 and 133. Therefore, when the gate and signals coincide, one of the voltmeters will only respond to the signal amplitude arriving from the left sectoral horn 10 of the beacon installation, while the other voltmeter will respond to the amplitude of the signal arriving from the right sectoral horn 11. The outputs of these voltmeters 132 and 133 are passed through D.C. filters 135 and 136 and then to a cathode follower bridge circuit comprising two cathode follower stages 137 and 138 with a zero center meter 139 in the output to give the "On Course" or localizer indication.

To obtain a "Crab" indication, i.e., the relative heading of the aircraft with respect to its line of bearing from the runway, the left and right video signals are passed directly to another pair of vacuum tube voltmeters 140 and 141 which again are gated by gate 2. In exactly the same manner as in the vacuum tube voltmeters 132 and 133, the signals are compared, fed through D.C. filters 142 and 143 to a zero center meter 146 in the cathode circuit of two cathode follower stages 144 and 145 to indicate the orientation of the receiving antennas with respect to the line of bearing of the aircraft from the runway. In practice the information supplied by the operator range, localizer and crab meters may be transmitted to the pilot either by providing a duplicate set of meters, as indicated in Fig. 4, or by orally reporting the readings of the operator's meters over the aircraft's intercommunication system.

Referring now to Fig. 6 showing the automatic gating circuit, the automatic volume control circuit, and the range delay circuit, a variable delay is introduced into the sensing circuits by means of a phantastron circuit as follows. The initiating pulse obtained from transmitter 101 is carried through a connector lead 147 to the suppressor grid 148 of tube 149, which is a special pentode designed for phantastron operation. The initiating pulse triggers the phantastron driving the plate 150 negative. From its initial position the plate drifts gradually negative, fairly linearly, according to the constants used in the circuit, to a level which is determined by the voltage on the plate of diode 151, which in turn is determined by the plate voltage on plate 152 of tube 153 to which the cathode of diode 151 is connected. A somewhat steeper-sided pulse is obtained on the screen grid 154 of tube 149.

This pulse is differentiated by condensers 155 and 156 so that the trailing edge of the phantastron output pulse triggers the tubes in the multivibrator gate generators, the pulses being coupled to the tubes through the plate 157 and grid 158 of tubes 159 and 160, respectively. These multivibrators, comprising tubes 159, 161 and 160, 162, are conventional plate-grid coupled, blocked multivibrators so arranged as to give output pulses of three and ten microseconds, respectively. Coupled from the plate 163 of tube 160 and plate 164 of tube 161, these plate pulses are then coupled to the automatic following, A.G.C. and "Crab" voltmeter circuits to perform the gating operation. The three microsecond gate, taken from the plate 164 of tube 161 in the first mentioned gated multivibrator, is fed through resistor 165 and condenser 166 to the grids of triode 167 which forms the vacuum tube voltmeter 114 for the automatic following channel. The ten microsecond gate is coupled from the plate 163 through resistor 168 and capacitor 169 to the grid of triode 170 forming voltmeter 122 for the A.G.C. channel.

The pentodes 171 and 172 having cathodes 173 and 174 connected through a common resistor 175 to ground, form the video mixer 113 in Fig. 5. The output of these signal mixers 171 and 172 is coupled from the common cathode resistor 175 to the plates 178, 179 of tubes 167, 170 through the condensers 176 and 177. The plates of the vacuum tube voltmeters 167 and 170 are coupled to the grids 180 and 181 of amplifiers 182 and 183 through D.C. filter combinations formed of resistances 184 and 185 and condensers 186 and 187. The diode 188 placed across resistor 184 serves merely as a conventional oscillation suppressing diode. The plate 189 of amplifier 182 is coupled though the resistor 190 to the plate 152 of the drift amplifier 153. In operation when the signal and the gate do not coincide in triode 167, the plate 178 of tube 167 is approximately at ground level. Therefore, the amplifier 182 is conducting heavily, placing the plate 189 of the amplifier 182 at low voltage tending to cut off drift amplifier 153. However, due to the feed-back action of condenser 191, connected between the plate 152 and grid 192 of drift amplifier 153, the plate 152 of drift amplifier 153 drifts positively quite slowly. The voltage level of the plate 152 of drift amplifier 153 sets the width, through the diode 151, of the phantastron pulse. When the three microsecond gate and the signal coincide in the tube 167, the plate 178 is driven negative due to the charge taken up by condenser 176. This negative going action is passed rapidly to the grid 180 of tube 182 through diode 188, filtered by the action of condenser 186 and resistor 184. This brings tube 182 to a condition approaching cut off, driving the plate 189 positive, and results in conduction through tube 153 bringing its plate 152 negative, thereby narrowing the pulse output of the phantastron tube 149. However, in so doing the gate is taken away from the signal, allowing the plate 178 of the vacuum tube voltmeter 167 to drift toward ground again, so that the action is reversed. In the net result, the three microsecond gate will rest on the leading edge of the signal. Diode 188 is used to give an asymmetrical time constant, thereby minimizing the tendency of the gate to oscillate. The manual gate control is inserted at the grid 192 of the tube 153. The automatic control voltage on the plate 189 of the amplifier 182 is passed through a connector to the terminal 193 of a manual-automatic control switch. The grid 192 of tube 153 is connected through a resistor 195 to the movable arm 194 of the control switch. The terminal 196, also in the switch, is connected to a movable arm 197 of a potentiometer 198 from which a predetermined negative D.C. voltage can be picked off. Thus the grid 192 of tube 153 may be connected to either the automatic control voltage from the plate of tube 182 or the manual control voltage from the potentiometer 198. By adjustment of the cut-off voltages of tubes 167, 170 and tubes 182, 183 through regulation of the D.C. voltage level on the grids of the tubes 167, 170 and on the cathodes of the tubes 182, 183 the threshold values of pulse amplitude necessary to operate the circuit may be determined. That is, the circuits may be so adjusted as not to operate on a pulse smaller than some predetermined amplitude, thereby preventing the automatic following circuits from acting on noise or smaller signals. In general, the beacon signal which the gate is required to follow will be the largest signal encountered. Also, since the response pulses of the beacon recur each cycle of operation of the airborne components at the same time with respect to the initiaing pulse, while noise occurs in a random time relation with the initiating pulse, the automatic following circuit will tend to lock on the recurring beacon pulse even when the amplitude of the random noise is greater.

Since the voltage which controls the pulse width of tube 149 is proportional to range, this voltage is used to give a range indication. The voltage is taken from the plate 152 of tube 153 to the grid 199 of tube 200, a cathode follower having a resistor 201 connected between its cathode 202 and ground, this tube being used to prevent the loading effect of the indicator from disturbing the automatic following circuit. The output of tube 200 coupled from the cathode resistor 201 is fed to a meter 119 calibrated to read range directly as a function of the voltage across the cathode resistor 201. Since, in general, the voltage corresponding to zero range will not be zero volts, it is necessary to provide a bucking voltage to balance out this zero indication. This is obtained from a potentiometer 204, the movable arm of which is connected to the negative terminal of the range meter 119. This potentiometer 204 is connected between a given positive voltage and ground.

The automatic gain control generator is quite similar to the automatic follower. The A.G.C. generator is composed of tubes 170, 183 and a quick-acting amplifier 205, the grid 206 of which is directly connected to the plate 207 of the tube 183. Gate 2 is used to gate the vacuum tube voltmeter 170 for the reason that the gate surrounds the signal in range. When the signal and the gate coincide, a voltage is developed from the plate 179 of the tube 170 which will be proportional to the amplitude of that signal. This voltage is filtered by the resistor 185 and condenser 187 and fed through the amplifiers 183 and 205 where it is amplified. This A.G.C. voltage is taken off of the plate 207 of amplifier 205 above the plate circuit resistor 208 and fed through a potentiometer 209 and a conventional filter 210 to the receiver of echo ranging equipment.

The "Crab" circuits are composed of tubes 211, 212, 213 and 214. Tubes 211 and 212 are vacuum tube voltmeters of the type previously described in the automatic following and A.G.C. circuits. In the embodiment shown, the right video signal from the right Yagi antenna 107 is coupled through a condenser 215 to the plate 216 of tube 211, while the left video signal from the left Yagi antenna 108 is coupled through the condenser 217 to the plate 218 of tube 212. The ten microsecond gate, the gate surrounding the signal in range, is passed directly from the plate 163 of tube 160 in the ten microsecond multivibrator circuit through resistor 219 and condenser 220 to the grids 221 and 222 of tubes 211, 212. In this case as before, when the signal and the gate coincide, the plates 216 and 218 of tubes 211 and 212 take on a negative potential proportional to the average amplitude of the signals on those plates. These voltages are filtered through resistors 223, 224 and condensers 225, 226 and fed to the grids 227 and 228 of pentodes 213 and 214. Cathode resistors 229 and 230 are connected between the cathodes 231 and 232 of the tubes 213, 214 and ground respectively. The outputs of these cathode followers 213 and 214 are taken off of the cathode resistors 229 and 230 through "Crab" indicating meter 146. A resistor 233 is inserted in series in one of these leads to cut down the output of the cathode followers to a value proper to energize the meter.

Referring now to Fig. 7 in which is shown the "On Course" or localizer indication circuit, the mixed video signal is taken off at the common cathode resistor 175 in the mixer tubes 171 and 172 of Fig. 6 and coupled through the resistor 235 of Fig. 7 to the grids 236 and 237 of tubes 238 and 239, these tubes having connected to the plates 240 and 241 thereof the tuned filter circuits comprising inductors 242 and 243 and condensers 244 and 245, respectively. Here the synchronizing slugs of different modulation frequencies are separated. These frequency slugs are coupled from plates 240 and 241 through condensers 246 and 247 to grids 248 and 249 in tubes 250, 251 where the slugs are detected, amplified and integrated so that synchronizing pips are obtained. This is by virtue of the fact that the tubes 250 and 251 are connected as a conventional infinite-impedance detector, in which the cathodes 252 and 253 are maintained at a positive voltage level at approximately cut off for these tubes by potentiometer 254 connected thereto. These synchronizing pips are taken from the plates 255 and 256 of tubes 250, 251 through condensers 257 and 258 to the plates 259, 260 of tubes 261 and 262 forming a free running multivibrator. The free running multivibrator comprising tubes 261 and 262 is running at approximately the speed of the ground antenna switch 14. The adjustment of this multivibrator speed is made by varying the D.C. voltage level applied to the grids 263 and 264 of tubes 261 and 262 through potentiometer 265. Since the tops of the output waves of the plates 259 and 260 of tubes 261 and 262 are not sufficiently flat for switching action, the output of the plates 259 and 260 are differentiated by condensers 266 and 267 and resistors 268 and 269 and fed to the grids 270 and 271 of the electronic switch comprising tubes 272 and 273. These pulses trigger the electronic switch back and forth to give flat top switching pulses. Since the electronic switch is triggered by the free running multivibrator rather than the synchronizing pulses directly, it is possible to miss several synchronizing R.F. slugs without interfering with the operation of the switching action. As a matter of fact, when the aircraft is sufficiently off course, only half the synchronizing pulses may be received, thus synchronizing the multivibrator on only half the cycles, the multivibrator carrying through during the remainder of the cycle so that the switching action of the electronic switch is not impaired. This electronic switch is of conventional design having R.C. combination 274, 275 between the grid 271 of tube 273 and plate 276 of tube 272 and resistor and capacitor 278 and 279, respectively, between the grid 270 of tube 272 and plate 277 of tube 273. The switching output of the electronic switch 272 and 273 is taken from the grids 270 and 271 thereof directly to the grids 280 and 281 of vacuum tube voltmeters 282 and 283 so that the vacuum tube voltmeters are alternately switched on and off in opposite phase. Thus tube 282 responds only to signals from one ground antenna, whereas tube 283 responds only to the signals from the other ground antenna. Tubes 282 and 283 are also gated in range by the ten microsecond gate. The negative gate pulse is taken from the plate of tube 162 in Fig. 6 and coupled to the grid 284 of tube 285 through condenser 286, the tube 285 having a cathode resistor 287 common to the cathodes 288 and 289 of tubes 282 and 283. In stand-by condition tube 285 is conducting, thereby biasing tubes 282 and 283 beyond cut off regardless of the switching pulse on the grid. When the ten microsecond gate occurs and drives the grid 284 of tube 285 negative, tube 285 is cut off allowing its cathode to fall into the conducting region for the section of the tube which has the positive switching pulse on its grid. The mixed video signal is coupled through condensers 290 and 291 to the plates 292 and 293, respectively, of tubes 282 and 283. Therefore, the switching pulse, gate, and video signal must coincide for any voltage to be registered upon the plate of tubes 282 and 283. The output from the plates 292 and 293 of tubes 282 and 283 are filtered by resistors 294 and 295 and condensers 296 and 297 and fed through the grids 298 and 299 of the cathode follower tubes 300 and 301. The cathodes 302 and 303 of these tubes 300 and 301 are coupled to ground through resistors 304 and 305. The voltages taken from the cathode of these cathode followers 300 and 301 are coupled directly to the localizer or "On Course" meter 139.

Thus the "On Course" circuits compare the signal strength of the two transmitted lobes, the upper channel generating a voltage in the cathode resistor 304 proportional to the left transmitted lobe and the lower channel generating a voltage in resistor 305 proportional to the right transmitted lobe. Since the meter 139 is a zero-center meter connected to compare these two voltages with respect to ground, it is apparent that when aircraft is so directed as to maintain this meter on center position, aircraft will follow the equi-signal course in line with the axis of the runway.

By maintaining the aircraft "On Course," the "Crab" indicator which gives the aircraft heading with respect to the runway axis will therefore indicate the wind drift to enable the pilot to make correction for the wind drift in the landing operation. Likewise, when approaching the landing pattern defined by the "On Course" radiations, knowledge of the heading of the aircraft relative to the bearing of the course defining beacon enables the pilot to make a smooth approach into the proper landing path irrespective of the initial bearing and off-course position of the aircraft.

This system possesses a marked freedom from the usual course bends occurring in present blind landing systems due to reflection of radiations from the ground and nearby obstructions, this due primarily to the use of pulsed radiations and the high degree of directivity of the sectoral horns. Since the additional distance that reflected radiations must travel is greater than that represented by the pulse width employed in physical embodiments of this system, such reflections will merely add on to the rear of the pulse, thus will cause no appreciable change in the gated signal and therefore will have no effect on the course indications. Also, unless the reflecting object is at a relatively narrow angle with respect to the course, the reflected signal will be quite weak since the signal strength of the radiation fields from the sectoral horns drops off rapidly at the sides of the course.

While the specific embodiment described employs airborne echo ranging apparatus in combination with the ground installation and the airborne position sensing unit to trigger the course and position defining beacon and to receive the radiations therefrom to supply position defining signals to the sensing unit, it is apparent that these functions could be performed by various well known means without necessitating the use of echo ranging apparatus with the system. For example, a low power pulse transmitter and a dual channel receiver coupled to a pair of directional antennas and to the position sensing unit could be employed to perform the critical functions of the echo ranging unit in the embodiment shown.

Various modifications may be made in the invention without departing from the spirit and scope thereof, and it is desired, therefore, that only such limitations shall be placed thereon as are imposed by the prior art.

The invention described herein may be manufactured and used by or for the Government of the United States of America for governmental purposes without the payment of any royalties thereon or therefor.

What is claimed is:

1. In a radio landing system in which a pair of alternately pulsed radiation fields overlap along the axis of a runway to define the axis and position of the runway, means for indicating in an aircraft the course path and range to the runway and wind drift, comprising dual-channel radio receiving means for receiving the pulses, directional receiving antennas positioned on opposite sides of the axis of the aircraft and having field patterns that overlap along said axis, each of said antennas being coupled to one of said receiver channels, means coupled to said receiver channels for comparing the output of each of said channels including indicating means for indicating the relative amplitude of the signals received in each of said antennas and calibrated in terms of the heading of the aircraft, automatic gating means rendering said receiving means operative only at the time said pulses reach said receiver, indicating means controlled by said gating means for indicating the range of said runway, a pair of signal amplifiers, means coupling said pair of pulsed fields to each of said signal amplifiers, indicating means coupled to both said signal amplifiers to indicate the relative amplitudes of the output of said amplifiers, gate generating means coupled to said amplifiers, and means synchronizing said gate generating means with said pulse fields whereby each of said signal amplifiers is sensitive to only one of said pulsed fields.

2. In a radio landing system, the combination set forth in claim 1 wherein said automatic tracking means comprises a rising voltage generator means, variable delay means controlled by the output of said generator means, said delay means controlling the time relationship between the generation of said gating means and the radiation of said pulses, signal measuring means coupled to both said antennas and gated in time by said gating means, said rising voltage generator means increasing the delay generated by said variable delay means under no-signal conditions, said generator means being controlled by the output of said gated signal measuring means to alter the output of said generator means and decrease the delay generated by said variable delay means, said generator and said gated signal measuring means being so interrelated that the delay generated by said variable delay means is maintained continuously proportional to the time lapse between the radiation of said pulses and the reception of said pulses whereby the gate generated by said automatic gating means is maintained coincident in time with respect to said radiated pulses.

3. In a radio landing system, means for determining the range from an aircraft to fixed pulse transmission means remote from said aircraft actuated by triggering signals transmitted from the aircraft comprising radio receiving means for receiving the pulses, means generating a short duration gate, voltmeter means coupled to the output of the receiver means, said voltmeter means being gated by said gate generating means, drift amplifier means coupled to the output of said gate generating means, said drift amplifier means being adjusted to generate a linearly increasing voltage with each cycle initiated by said triggering signals, the initial level of the voltage being proportional to the combined amplitude of the gate and pulse in said gated voltmeter, delay pulse generating means coupled to said drift amplifier output for controlling the duration of the delay pulses generated thereby as a function of the average level of said voltages, said gate generating means being actuated by the trailing edge of said delay pulses to initiate the gate generated by said gate generating means whereby said gate occurs in coincidence with the reception of said transmitted pulses, and amplifier means having indicator means in the output circuit thereof to indicate in terms of range the average amplitude of said voltage output of said drift amplifier.

4. In a radio landing system in which a pair of alternately energized pulse radiation fields overlap along the center line of a runway to define the axis of said runway, each of said fields comprising a series of pulses modulated at a frequency different from the modulation frequency of the other of said fields, means for indicating in an aircraft the equi-signal path of said radiation fields comprising radio receiving means for receiving said pulses, a pair of voltmeter means coupled to said receiving means, frequency sensitive means coupled to said receiving means for separating the pulses as a function of their modulation frequency, amplifier means for detecting and sharpening said pulses, switch-gate generating means coupled to said amplifier means and adapted to be synchronized by said pulses to generate a pair of gating voltages for rendering each of said pair of voltmeter means alternately operative in synchronism with said alternately energized radiation fields whereby a pair of pulsed voltages proportional to the amplitude of each of said fields are generated by said voltmeter means, means averaging the amplitude of the voltages from each of said voltmeter means, and a pair of amplifier means coupled to said averaging means and having indicating means connected between said pair of amplifier means for indicating the comparative amplitude of each of said radiation fields in terms of the position of said aircraft relative to the axis of said runway.

5. In a radio landing system in which a pair of alternately energized radiation fields overlap along the axis of a runway to define the axis and position of the runway, each of said fields consisting of a series of pulses bearing a time relation to the position of the source of said radiating field with respect to said runway and being modulated at a different frequency from the modulation frequency of the other of said fields, means responsive to said radiation fields for indicating in an aircraft the course path and range to the runway and wind drift comprising dual channel radio receiving means for receiving the pulses, directional antennas positioned on opposite sides of the axis of said aircraft and having field patterns that overlap along said axis, each of said antennas being coupled to one of said receiver channels, means coupled to the outputs of said receiver channels having indicating means responsive to the relative amplitude of said outputs to indicate the orientation of said receiving antennas with repsect to their line of bearing with the source of said radiation fields, automatic gating means for rendering said receiving means operative only at the time said pulses reach said receiver, automatic tracking means maintaining said automatic gating means in proper time relation with said pulses, indicating means coupled to said automatic tracking means and responsive thereto for indicating the range of said runway, frequency sensitive means for separating the pulses radiated from said radiation fields, a pair of measuring circuits coupled to said antenna, gate generating means coupled to said measuring circuits and to said frequency sensitive means and controlled by said frequency sensitive means to render each of said measuring circuits responsive to only one of said radiation fields, and indicating means coupled to the output of each of said measuring circuits and responsive to said output to indicate the relative strength of said radiation fields.

References Cited in the file of this patent

UNITED STATES PATENTS

| | | |
|---|---|---|
| 2,108,867 | Mathieu | Feb. 22, 1938 |
| 2,122,091 | Davies | June 28, 1938 |
| 2,134,716 | Gunn | Nov. 1, 1938 |
| 2,165,256 | Hansell | July 11, 1939 |
| 2,201,174 | Harding et al. | May 21, 1940 |
| 2,228,692 | Davies | Jan. 14, 1941 |
| 2,288,196 | Kramar | June 30, 1942 |
| 2,321,698 | Nolde | June 15, 1943 |
| 2,408,048 | Deloraine et al. | Sept. 24, 1946 |
| 2,410,868 | De Forest | Nov. 12, 1946 |
| 2,414,469 | Isbister | Jan. 21, 1947 |
| 2,418,143 | Stodola | Apr. 1, 1947 |
| 2,433,381 | Marchand | Dec. 30, 1947 |
| 2,437,313 | Bedford | Mar. 9, 1948 |
| 2,441,956 | Deloraine, et al. | May 25, 1948 |
| 2,527,547 | Hardy | Oct. 31, 1950 |
| 2,628,349 | Nightenhelser | Feb. 10, 1953 |

FOREIGN PATENTS

| | | |
|---|---|---|
| 469,417 | Great Britain | July 26, 1937 |